(12) United States Patent
Korn (10) Patent No.: US 9,054,526 B2
(45) Date of Patent: Jun. 9, 2015

(54) METHOD FOR OPERATING A CONVERTER AND A SWITCHING CELL AND A CONVERTER

(71) Applicant: ABB Technology AG, Zürich (CH)

(72) Inventor: Arthur Korn, Baden (CH)

(73) Assignee: ABB TECHNOLOGY AG, Zurich (CH)

( * ) Notice: Subject to any disclaimer, the term of this patent is extended or adjusted under 35 U.S.C. 154(b) by 226 days.

(21) Appl. No.: 13/683,046

(22) Filed: Nov. 21, 2012

(65) Prior Publication Data

US 2013/0128635 A1 May 23, 2013

(30) Foreign Application Priority Data

Nov. 22, 2011 (EP) .................................... 11190134

(51) Int. Cl.
| | |
|---|---|
| *H02M 1/32* | (2007.01) |
| *H02H 7/10* | (2006.01) |
| *H02M 7/49* | (2007.01) |
| *H02H 7/12* | (2006.01) |
| *H02M 7/483* | (2007.01) |

(52) U.S. Cl.
CPC . *H02H 7/10* (2013.01); *H02H 7/12* (2013.01); *H02M 1/32* (2013.01); *H02M 7/49* (2013.01); *H02M 2001/325* (2013.01); *H02M 2007/4835* (2013.01)

(58) Field of Classification Search
CPC ............................ H02M 2001/325; H02H 7/12
USPC ...................... 700/293; 363/50–56.02, 57–58
See application file for complete search history.

(56) References Cited

U.S. PATENT DOCUMENTS

| | | |
|---|---|---|
| 2005/0083716 A1 | 4/2005 | Marquardt |
| 2008/0232145 A1 | 9/2008 | Hiller et al. |
| 2011/0075465 A1 | 3/2011 | Winkelnkemper et al. |
| 2011/0235221 A1* | 9/2011 | Vogeli .............................. 361/18 |
| 2014/0002933 A1* | 1/2014 | Gao et al. ......................... 361/18 |

FOREIGN PATENT DOCUMENTS

| | | |
|---|---|---|
| CN | 102170110 A * | 8/2011 |
| WO | WO 03/090331 A2 | 10/2003 |
| WO | WO 2011/116816 A1 | 9/2011 |

OTHER PUBLICATIONS

Derwent transcription of Gao, Yang; CN 10270110, Aug. 2011, 3 pages.*

(Continued)

*Primary Examiner* — Harry Behm
(74) *Attorney, Agent, or Firm* — Buchanan Ingersoll & Rooney PC (57) ABSTRACT

Exemplary embodiments are directed to a method for operating a converter, wherein the converter includes a plurality of bridge branches having one or more switching cells connected in series. Each bridge branch connects one of a plurality of inputs to one of a plurality of outputs of the converter. The method includes monitoring each of the switching cells in order to determine a fault. If a fault is identified in one of the switching cells, triggering one of the triggering elements for short-circuiting switching cell connections if the fault identified in the switching cell is not followed by identification of a fault in a further one of the switching cells within a predetermined period of time.

6 Claims, 3 Drawing Sheets

(56) References Cited

OTHER PUBLICATIONS

European Search Report issued on May 7, 2012 for European Application No. 11190134.4, 7 pages.

Laxman Maharjan et al., Fault-Tolerant Operation of a Battery-Energy-Storage System Based on a Multilevel Cascade PWM Converter with Star Configuration, IEEE Transactions on Power Electronics, vol. 25, No. 9, Sep. 2010, pp. 2386-2396.

B. Gemmell et al., Prospects of Multilevel VSC Technologies for Power Transmission, Transmission and Distribution Conference and Exposition, Apr. 21, 2008, Piscataway, NJ, pp. 1-16.

* cited by examiner

Fig. 3

METHOD FOR OPERATING A CONVERTER AND A SWITCHING CELL AND A CONVERTER

RELATED APPLICATION

This application claims priority under 35 U.S.C. §119 to European application 11190134.4 filed in Europe on Nov. 22, 2011, the content of which is hereby incorporated by reference in its entirety.

FIELD

The disclosure relates to converters, such as modular multi-level power converters, and measures for identifying faults in a converter.

BACKGROUND INFORMATION

Known converter circuits are used in various ways. For example, direct converters have advantages for operating drives since in some implementations they can drive higher currents than indirect converters with the same effort.

Modular multi-level converters (abbreviations=MMC, MMLC or M2LC) are used, for example, as direct converters. Such converters have converter branches which connect each input-side phase line to an output-side phase line. Such converters may also be used as partial converters which are connected to one another in series.

Each of the converter branches has a series circuit including an inductor and one or more switching cells in the form of two-pole networks. The switching cells may be constructed with a half-bridge or full-bridge circuit and may have an energy store, for example a switching cell capacitor. By means of suitable connection, the converter branch can be connected in such a manner that the energy store is connected into the converter branch or is disconnected from the latter. The direct converter can be driven for each switching cell individually such that no voltage is applied to the terminals of the respective switching cell and this allows only a passive current flow through freewheeling diodes or the voltage of the energy store is dropped across the terminals of the respective switching cell, that is to say the voltage of the switching cell capacitor in the case of a half-bridge connection or the non-inverted or inverted voltage of the switching cell capacitor in the case of a full-bridge connection. Direct converters of this type are known, for example, from the document WO 03/090331 or US 2011/0075 465 A1.

Faults may occur in direct converters. If a fault occurs, an immediate reaction can be specified in order to avoid destruction of components.

The document US 2008/0232 145 A1, for example, discloses a multi-level converter in which the converter branches have a plurality of switching cells. If a fault occurs in one of the switching cells, which can be identified, for example, by comparing a measured output voltage with an expected voltage, the relevant switching cell is bridged.

The document Maharjan, L. et al., "Fault-Tolerant Operation of a Battery-Energy-Storage System Based on a Multi-level Cascade PWM Converter with Star Configuration", IEEE Transactions on power electronics, Volume 25, No. 9, Sep. 2010, pages 2386-2396, proposes, after a fault has been identified in a switching cell of the converter, short-circuiting the switching cell, with the result that the converter can continue to be operated with the other switching cells. Faulty switching cells can be determined, for example, using changes in the output voltage profile and/or the capacitor voltage profile.

The full-bridge circuits or half-bridge circuits in the switching cells can have IGBTs as power semiconductor components for switching electrical currents. In the case of IGBT power semiconductor switches, the internal resistance suddenly increases as of a certain current intensity carried, which can be referred to as IGBT desaturation, for example. If desaturation occurs in an IGBT, the latter should be immediately switched off since the power converted in the IGBT may quickly exceed the maximum permissible power on account of the voltage increase resulting from the increase in resistance. For example, IGBTs are nowadays able to withstand the occurrence of desaturation and disconnection of the overcurrent for a predetermined period of time, for example up to 10 μs, if the intermediate circuit does not have an excessively large stray inductance. So that rapid disconnection can be carried out after the occurrence of IGBT desaturation has been determined, a switching cell control unit which is specified for this purpose and is intended to monitor the switching cell and to disconnect the IGBTs is directly provided in the individual switching cells. Only after desaturation has been identified by the switching cell control unit and the IGBT has been disconnected is a central control unit informed of the disconnection of the relevant switching cell.

So that the switching cell can quickly react to an identified fault, the individual switching cells may be provided with bridging elements, with the result that faulty switching cells can be reliably short-circuited. Thyristor circuits, electromechanical switches, pyrotechnic switches, or broken-down semiconductors are known as bridging elements. However, many proposed bridging elements may only be short-circuited once and can no longer be readily opened.

Overcurrents in IGBTs, which result in desaturation, can now be caused not only by faults in the switching cells themselves but also by other faults which occur outside the power converter or outside the switching cells.

Therefore, as long as it is reliably identified that the fault is present in the switching cell in which the bridging element is closed, the bridging element can remain closed. However, since faults which are outside the relevant switching cell are also incorrectly associated with a switching cell with the structure described above, the situation may arise in which functional switching cells are bridged and, as a result, would be rendered permanently non-functional since the short circuit across the switching cell cannot be canceled again using a simple measure. However, it has hitherto been assumed that each switching cell in which a fault is identified is defective or faults in the switching cells are identified outside the switching cells and are associated with the switching cells by complicated analysis methods.

WO 2011/116816 A1 likewise specifies a multi-level converter having switching cells, wherein a triggering element for short-circuiting switching cell connections (WO 2011/116816 A1, FIG. 5, reference symbol 18) is provided between two switching cells (WO 2011/116816 A1, FIG. 5, reference symbols 6a, 6b), wherein the triggering signal is generated by a central control unit (main controller) directly or via a cell control unit (WO 2011/116816 A1, FIG. 5, reference symbol 34) with a time delay with respect to the occurring fault and is sent to the triggering element.

"Prospects of Multilevel VSC Technologies for Power Transmission", B. Gemmell et al, Transmission and Distribution Conference and Exposition, 2008, T&D IEEE/PES, Piscataway, N.J., USA, Apr. 20, 2008, likewise discloses a multi-level converter of the generic type having switching cells.

SUMMARY

An exemplary method for operating a converter is disclosed, wherein the converter comprises a plurality of bridge branches having one or more switching cells connected in series, wherein each bridge branch connects one of a plurality of inputs to one of a plurality of outputs of the converter, the method comprising: monitoring each of the switching cells to determine a fault; if a fault is identified in a first switching cell, triggering one of the triggering elements for short-circuiting switching cell connections if the fault identified in the first switching cell is not followed by identification of a fault in a second switching cell within a predetermined period of time; communicating the identification of the fault in the first switching cell to a central monitoring device; starting a timer in the central monitoring device; and carrying out a check in the central monitoring device to determine whether occurrence of a fault in the first switching cell is communicated before expiry of a predetermined period of time, triggering at the central monitoring device a relevant triggering element of the first switching cell if a fault in the second switching cell is not communicated during the predetermined period of time.

An exemplary switching cell for a converter including one or more half-bridge circuits and an energy store is disclosed, the switching cell comprising: a monitoring unit configured to: monitor the switching cell to determine a fault; send an indication of the occurrence of the fault to a central monitoring device; and trigger a triggering element for short-circuiting switching cell connections if a triggering signal is received by the central monitoring device in response to an indication of the occurrence of the fault.

An exemplary converter having a number of inputs and a number of outputs for converting an input voltage into an output voltage is disclosed, the converter comprising: a plurality of bridge branches having one or more switching cells connected in series, wherein each bridge branch connects one of the inputs to one of the outputs; a monitoring unit in each of the switching cells which is designed to determine a fault; a triggering element in each of the switching cells which is designed to short-circuit switching cell connections; and a central monitoring device which has a communication link to each of the monitoring units and is designed to receive an indication of a fault identified in one of the monitoring units, and to trigger one of the triggering elements if a fault in a second switching cell is not identified after a fault has been identified in a first switching cell.

BRIEF DESCRIPTION OF THE DRAWINGS

Exemplary embodiments of the present disclosure are explained in more detail below using the accompanying drawings, in which.

DETAILED DESCRIPTION

Exemplary embodiments of the present disclosure provide that, in a modular direct converter having switching cells, none of the switching cells is permanently short-circuited on account of an incorrectly identified fault inside the switching cell.

An exemplary embodiment disclosed herein provides a method for operating a converter, wherein the converter includes a plurality of bridge branches having one or more switching cells connected in series, wherein each bridge branch connects one of a plurality of inputs to one of a plurality of outputs of the converter, The method includes steps in which each of the switching cells is monitored in order to determine a fault, if a fault is identified in one of the switching cells, one of the triggering elements for short-circuiting switching cell connections is triggered if the fault identified in the switching cell is not followed by identification of a fault in a further one of the switching cells, wherein the identification of the fault in the one switching cell is communicated to a central monitoring device, wherein a timer in the central monitoring device is started, wherein a check is carried out in the central monitoring device in order to determine whether occurrence of a fault in a further one of the switching cells is communicated before the expiry of a predetermined period of time, wherein the central monitoring device triggers the relevant triggering element of the one switching cell if a fault in a further switching cell is not communicated during the predetermined period of time.

This exemplary method has the advantage that no switching cell is bridged on account of a previously identified fault as long as it is possible for the fault to also be outside the relevant switching cell. For example, when using triggering elements in the switching cells, which permanently short-circuit a switching cell, the relevant switching cell being rendered unusable as a result of the short circuit can be avoided even though it is functioning correctly.

The converter operated by the above exemplary method includes a monitoring means with which a determined fault in a switching cell is assumed to be a fault in the switching cell if the fault occurs only in the relevant switching cell, whereas another fault is inferred if faults are identified in a plurality of switching cells at the same time or with a slight temporal offset. In other words, an external effect on the converter is assumed if a fault is identified in a plurality of switching cells.

Provision may be made for the switching cells to be monitored in such a manner that desaturation of an IGBT used in the switching cells is identified as a fault in one of the switching cells.

Furthermore, the switching cells may be monitored in such a manner that a voltage change outside a switching time window, during which one or more power semiconductor switches are driven to switch, for example a voltage change which exceeds a predetermined voltage magnitude, is identified as a fault in one of the switching cells.

According to another embodiment, one of the triggering elements for short-circuiting switching cell connections can be triggered if a fault in a further one of the switching cells is not identified at the same time as or with a slight temporal offset with respect to the fault identified in the switching cell within a predetermined period of time.

Provision may be made for one of the triggering elements for short-circuiting switching cell connections to be triggered only when the identification of a fault in a specified (e.g., selected) one of the switching cells, at the same time as or with a slight temporal offset with respect to which a fault is not identified in a further one of the switching cells during a predetermined period of time, has repeatedly occurred for the specified switching cell.

Furthermore, after a fault has been identified in one of the switching cells, driving of power semiconductor switches of the relevant switching cell can be suppressed; for example, the power semiconductor switches can be switched off.

According to another exemplary embodiment, if the identification of a fault in one of the switching cells is followed by the identification of a fault in a further switching cell, the power semiconductor switches of a plurality of or all switching cells can be switched off.

Still another exemplary embodiment of the present disclosure provides a switching cell for a converter having one or more half-bridge circuits and having an energy store, wherein a monitoring unit is provided for the purpose of monitoring the switching cell in order to determine a fault, externally providing, if a fault is identified, a central monitoring device with an indication of the occurrence of the fault, and triggering a triggering element for short-circuiting switching cell connections if a triggering signal is received by the central monitoring device in response to an indication of the occurrence of the fault, the central monitoring device being externally provided with said indication.

An exemplary embodiment of the present disclosure provides a converter having a number of inputs and a number of outputs for converting an input voltage into an output voltage, including a plurality of bridge branches having one or more switching cells connected in series, wherein each bridge branch connects one of the inputs to one of the outputs, a respective monitoring unit in each of the switching cells which is designed to determine a fault, a respective triggering element in each of the switching cells which is designed to short-circuit switching cell connections, a central monitoring device which has a communication link to each of the monitoring units and is designed to receive an indication of a fault identified in one of the monitoring units, and to trigger one of the triggering elements if a fault in a further one of the switching cells is not identified after a fault has been identified in one switching cell.

Figure 1:
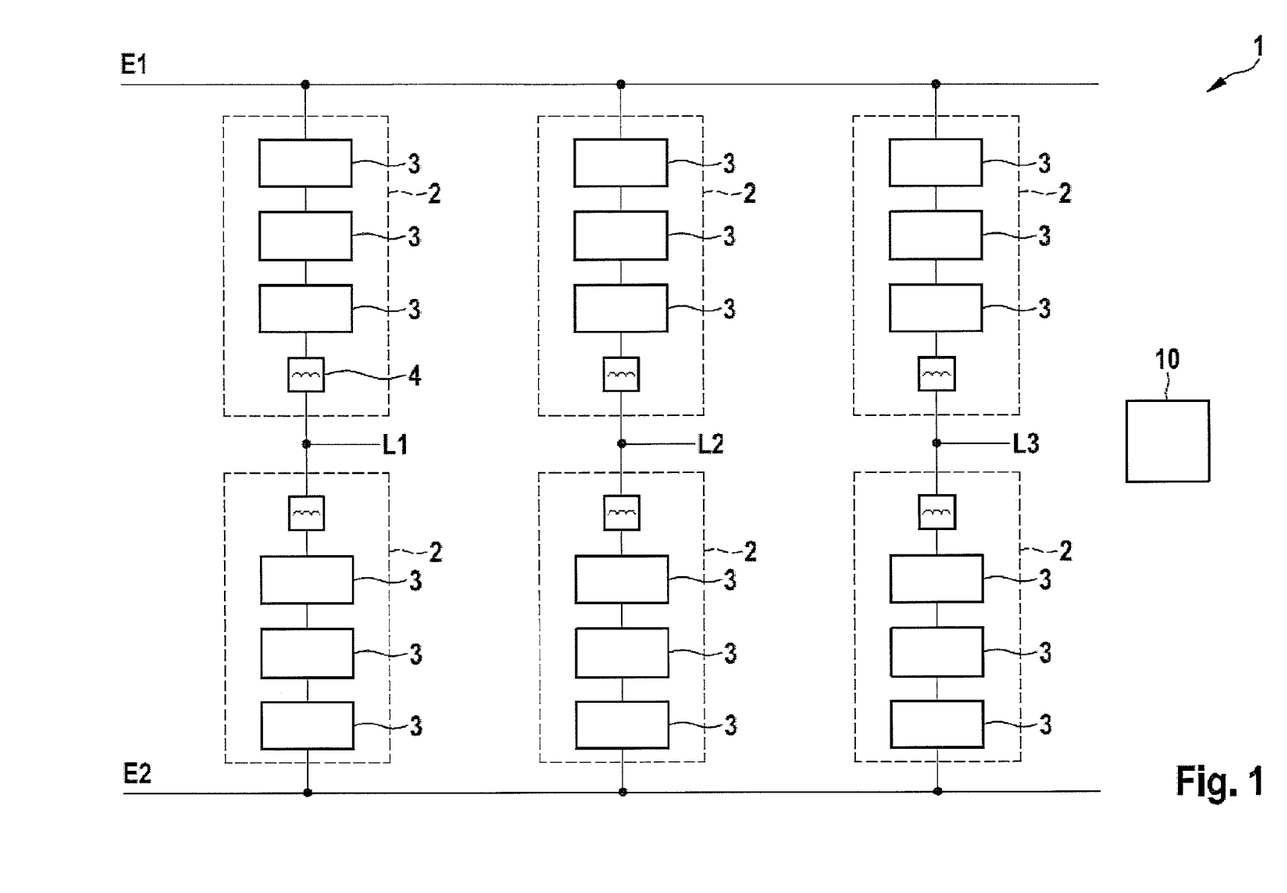
FIG. 1 shows a schematic illustration of a modular multi-level converter in accordance with an exemplary embodiment of the present disclosure.

FIG. 1 shows a schematic illustration of a modular multi-level converter in accordance with an exemplary embodiment of the present disclosure. The exemplary converter 1 of FIG. 1 is in the form of a modular multi-level converter (MMC, MMLC, or M2LC). The converter 1 has input lines as inputs E, a first input E1, and a second input E2 in the present exemplary embodiment. The converter 1 also has outputs L, a first output L1, a second output L2 and a third output L3 in the present exemplary embodiment. Each of the inputs E1, E2 is connected to each of the outputs L1, L2, L3 via a bridge branch 2. The bridge branches 2 can be of identical design, but it is also possible to provide different topologies of the bridge branches 2.

The converter 1 can be used in a bidirectional manner depending on driving, with the result that the energy flow may be directed from the inputs E1, E2 to the outputs L1, L2, L3 and from the outputs L1, L2, L3 to the inputs E1, E2.

Each of the bridge branches 2 has one or more switching cells 3 connected in series. In the present exemplary embodiment, each bridge branch 2 has four switching cells 3 connected in series.

An induction coil 4 as an inductance is also provided in series with the series-connected switching cells 3 of each bridge branch 2.

Figure 2A:
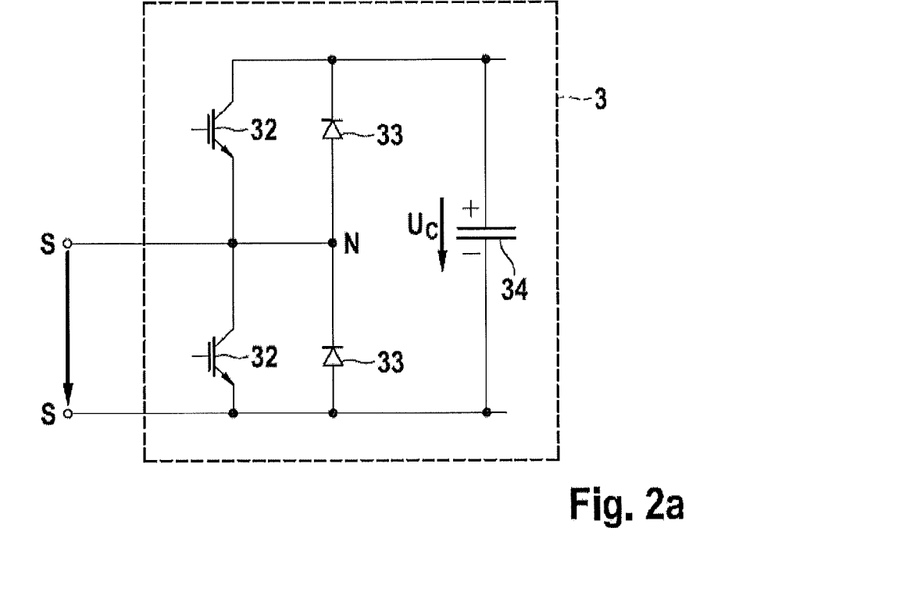
FIGS. 2a and 2b show schematic illustrations of the switching cell for constructing the modular multi-level converter in FIG. 1 in accordance with an exemplary embodiment of the present disclosure.

FIGS. 2a and 2b show schematic illustrations of the switching cell for constructing the modular multi-level converter in FIG. 1 in accordance with an exemplary embodiment of the present disclosure. The switching cell 3 in FIG. 2a substantially includes a half-bridge circuit, for example only one half-bridge circuit, having two power semiconductor switches 32 which are connected in series and each have a freewheeling diode 33 connected in parallel therewith. The freewheeling diode 33 may be in the form of a discrete component or may be integrated with the power semiconductor switch 32. An energy store 34 in the form of a capacitance is connected in parallel with the series circuit including the two power semiconductor switches 32. The power semiconductor switches 32 may be in the form of IGBTs, IGCTs, MOSFETs, or other appropriate controllable power transistors as desired. External switching cell connections S of the switching cells 3 are provided at a node N between the power semiconductor switches 32 and one of the connections of the energy store 34 in order to connect the switching cell 3 in the respective bridge branch 2 of the converter 1.

Regarding the power semiconductor switches 32, their switching function, that is to say the closing and opening of a conductive connection, is substantially used. IGBTs can be used as power semiconductor switches 32, for example, for medium-voltage applications.

Figure 2B:
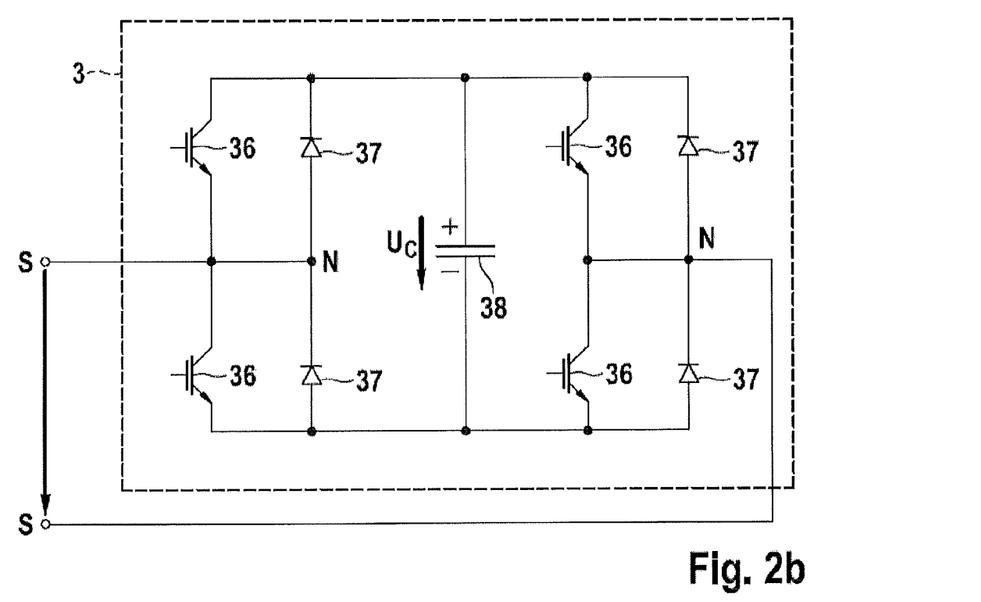

The switching cell 3 in FIG. 2b is in the form of an H-bridge circuit and has two parallel-connected series circuits including power semiconductor switches 36. Each of the power semiconductor switches 36 is provided with a freewheeling diode 37 which is connected in parallel therewith and may either be in the form of a discrete component or may be integrated with the power semiconductor switch 36. The freewheeling diodes 37 can be arranged in the reverse direction with respect to the forward direction of the power semiconductor switches 36.

The external switching cell connections S for connecting the switching cell 3 in the respective bridge branch 2 of the converter 1 are provided at the nodes N between the two power semiconductor switches 36 of the series circuits. The two series circuits are connected in parallel with one another and with an energy store 38 in the form of a storage capacitor.

The switching cells 3 are driven by a control unit 10 in order to convert an input voltage, either a DC voltage or an AC voltage, into a desired output voltage, either a DC voltage or an AC voltage. Each of the switching cells 3 may be driven in such a manner that it can assume different states. In a first state, the switching cell 3 may be switched in such a manner that its connections are connected to the energy store 34, 38. In this manner, the energy store 34, 38 can be charged or discharged, for example, the charge can freely flow to or from the energy store 34, 38. In the first state, the energy store voltage is also substantially applied to the switching cell connections S, with the result that the voltage potential at the output associated with the bridge branch 2 results from a voltage balance of the voltage potentials at the input associated with the bridge branch 2 and at the switching cells 3 switched to the first state in the corresponding bridge branch.

In a further state, the output voltage of the switching cell 3 depends on the current direction through the bridge branch 2, depending on whether or not current is allowed to flow through the freewheeling diodes 33, 37. The switching cell 3 then always provides a switching cell voltage which is directed counter to the current flowing through the switching cell 3, with the result that the energy store 34, 38 can absorb energy. The desired voltages at the outputs L1, L2, L3 or phase voltages can thus be produced for each output L1, L2, L3 from the input voltages and input currents in conjunction with the energy store voltages of the accordingly switched switching cells 3 by switching the switching cells 3 in the converter branches 2 in a controlled manner according to a specification of the output-side electrical variables.

In addition to providing desired output voltages and output currents, previous drive methods for the converter 1, operated by the control unit 10, also follow a strategy of keeping the energy stores 34, 38 in the switching cells 3 at a constant energy level or voltage level as far as possible, that is to say the energy respectively stored in the energy stores 34, 38 remains constant on average or the energy store voltage which is established across the respective capacitive energy store 34, 38 varies substantially within a predefined fluctuation range. In this case, the control unit 10 uses a strategy from strategies which are known per se, by means of which the capacitive energy stores 34, 38 are connected into the converter branches 2 with alternating polarity. This is substantially achieved by virtue of the fact that the polarity of the current flows through each of the switching cells 3 is substantially alternately reversed or the current flows are polarized counter to the direction of the voltage difference across the relevant bridge branch in order to thus effect cycles of charging and discharging the capacitive energy stores 34, 38.

The topology of the converter 1 shown in FIG. 1 is only exemplary. The structure shown above can be scaled to any desired number of inputs E and any desired number of outputs L in any desired manner. Features common to each exemplary embodiment include a bridge branch 2 constructed from one or more switching cells 3 connected in series is arranged between each input and each output.

Each bridge branch 2 can have a plurality of switching cells 3 which are suitable, for example, for medium-voltage applications, since the voltage load on each switching cell 3 is reduced there in comparison with the input and output voltages.

Each of the switching cells 3 also has a monitoring unit 39 which can detect faulty behavior. For example, when using IGBT power semiconductor switches, IGBT desaturation may arise, in which the resistance of the IGBT power semiconductor switch suddenly increases as of a certain current intensity in the conducting switching state. If such desaturation occurs, the relevant IGBT should be immediately switched off in order to avoid destruction of the IGBT or other circuit parts.

IGBTs can usually withstand the occurrence of desaturation for a short period of time of a plurality of microseconds. Therefore, it should be ensured that disconnection is carried out quickly enough when IGBT desaturation occurs. A monitoring unit 39 which monitors the switching cell for desaturation is therefore provided in the switching cells 3. For this purpose, the monitoring unit 39 can monitor the voltage applied to the switching cell connections and can determine a fault if a voltage change or a voltage change above a specified voltage difference occurs outside a time window in which one or more of the power semiconductor switches are switched. It can be assumed that a change in an output voltage at the switching cell 3 occurs outside a switching operation of one or more of the power semiconductor switches 32, 36 if one of the power semiconductor switches 32, 36 enters desaturation.

However, it is also possible for faults outside the switching cell 3 to result in a sudden change in the switching cell voltage or IGBT desaturation. This may be, for example, short circuits at inputs and/or outputs and/or between inputs and outputs.

The switching cell connections S of the switching cell 3 in which a fault has been determined are short-circuited with the aid of a triggering element 41, for example in the form of thyristor circuits, electromechanical switches, pyrotechnic switches or broken-down semiconductor components. These have the common feature that they can no longer be readily opened if, after triggering, it is determined that the fault identified in the switching cell 3 has been incorrectly interpreted as a fault in the switching cell 3 and an external fault cause is instead responsible for triggering the monitoring unit 39.

Figure 3:
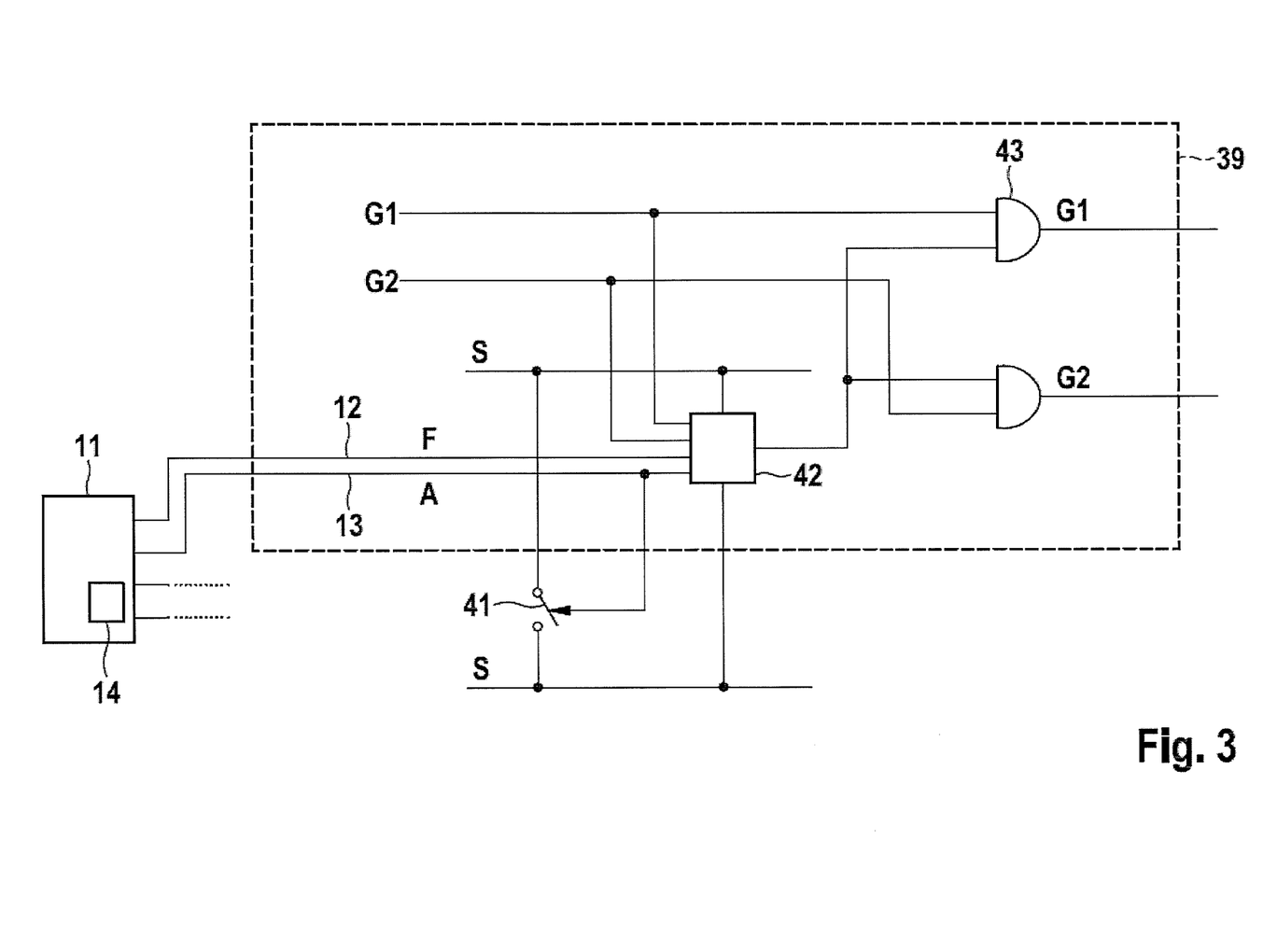
FIG. 3 shows an illustration for identifying desaturation of the IGBT semiconductor components in a switching cell of a converter in accordance with an exemplary embodiment of the present disclosure.

FIG. 3 shows an illustration for identifying desaturation of the IGBT semiconductor components in a switching cell of a converter in accordance with an exemplary embodiment of the present disclosure. FIG. 3 illustrates a monitoring unit 39 of a switching cell 3 and a monitoring device 11, which may be arranged in the central control unit 10, in more detail. The monitoring device 11 can have a communication link to the monitoring units 39 of a plurality of switching cells 3, to the monitoring units 39 of each of the switching cells 3, and is able to obtain a fault signal via a fault signal channel 12 and to transmit a triggering signal, via a triggering signal channel 13, to the triggering element 41 of the monitoring unit 40 of an addressed switching cell 3 in order to trigger the triggering element 41 and to short-circuit the switching cell connections S of the relevant switching cell 3.

The fault signal and the triggering signal may be transmitted, together with a multiplicity of other control and notification signals, via an electrical or optical digital communication link.

The monitoring unit 39 has a voltage detection unit 42 which monitors the voltage on the output lines of the switching cell 3. The voltage detection unit 42 outputs a logic "1" to first connections of AND gates 43 which are provided for each of the control signals G1, G2. The control signals G1, G2 for driving the power semiconductor switches 32, 36 are applied by the control unit 10 to second connections of the AND gates 43. The voltage detection unit 42 also receives the control signals G1, G2 from the control unit 10 and masks voltage detection, with the result that voltage detection is prevented within a switching time window during which the IGBTs are switched. During the periods of time during which the power semiconductor switches 32, 36 within the relevant switching cell 3 are not switched or are in a switching time window, the voltage detection unit 42 identifies a change in the voltage which has occurred, for example, on account of a fault either inside the relevant switching cell 3 or on account of an external fault cause.

If a voltage change, such as a voltage change which exceeds a predetermined voltage change magnitude, is determined outside the switching time window of the power semiconductor switches 32, 36, the voltage detection unit 42 generates a logic "0" which is respectively applied to the first inputs of the AND gates 43. As a result, the control signals G1, G2 are blocked and a logic "0" is applied to the power semiconductor switches 32, 36 of the relevant switching cell 3, as a result of which the latter is disconnected, that is to say switched off.

At the same time, a fault signal is transmitted to the central monitoring device 11 via the fault signal channel 12. With the reception of the first fault signal F, a timer 14 is started in said monitoring device and monitoring is carried out in order to determine whether a further fault signal F is received from a further switching cell 3 during a predetermined period of time. If a further fault signal F is received from a further one of the switching cells 3, an external fault is inferred and the control unit 10 is instructed to change the converter 1 to a safe state, for example by switching off all power semiconductor switches 32, 36 in the switching cells 3 by providing suitable control signals G1, G2. In this case, no triggering signal A which indicates that the triggering element 41 is intended to be triggered is transmitted.

If a further fault signal is not received from one of the other switching cells 3 during the predetermined period of time after the fault signal F was received for the first time, it can be assumed that the switching cell 3 whose monitoring unit 39 transmitted the fault signal F has a malfunction, and the triggering signal A is transmitted to the triggering unit 41 of the relevant switching cell 3, which signal short-circuits the switching cell connections S of the relevant switching cell 3.

If a fault signal is instead received from one of the other switching cells 3 during the predetermined period of time after the fault signal F was received for the first time, it can be assumed that the malfunction is outside the switching cell 3 which transmitted the first fault signal. In this case, as a response, the power semiconductor switches 32, 36 of the switching cell 3 which transmitted the first fault signal, of a plurality of the switching cells 3 or of all switching cells 3 may be switched off.

According to another exemplary embodiment of the present disclosure, after the fault signal F has been received from one of the switching cells for the first time without a further fault signal being received within the predetermined period of time, provision may be made for the voltage detection unit 42 to first of all be reset via a suitable communication link (not shown), with the result that the control signals G1, G2 are applied to the power semiconductor switches 32, 36 of the relevant switching cell 3 again in order to thus reset the switching cell 3 to normal operation again. This makes it possible to avoid brief interference, which occurs only once or a few times, resulting in complete disconnection of the relevant switching cell 3. The triggering signal A can be transmitted to the triggering element 41 of the relevant switching cell 3 only when the one-off fault in the switching cell 3, which generated the fault signal F, has been determined again or a predetermined number of times by the monitoring unit 39 of the relevant switching cell 3.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Converter
2 Converter branch
3 Switching cell
4 Induction coil
10 Control unit
11 Central monitoring device
12 Fault signal channel
13 Triggering signal channel
32, 36 Power semiconductor switches
33, 37 Freewheeling diodes
34, 38 Energy stores
39 Monitoring unit
41 Triggering unit
42 Voltage detection unit
43 AND gate

What is claimed is:

1. A method for operating a converter, wherein the converter comprises a plurality of bridge branches having one or more switching cells connected in series, wherein each bridge branch connects one of a plurality of inputs to one of a plurality of outputs of the converter, the method comprising:
    monitoring each of the switching cells to determine a fault;
    if a fault is identified in a first switching cell, triggering one of the triggering elements for short-circuiting switching cell connections if the fault identified in the first switching cell is not followed by identification of a fault in a second switching cell within a predetermined period of time;
    communicating the identification of the fault in the first switching cell to a central monitoring device;
    starting a timer in the central monitoring device;
    carrying out a check in the central monitoring device to determine whether occurrence of a fault in the first switching cell is communicated before expiry of a predetermined period of time, triggering at the central monitoring device a relevant triggering element of the first switching cell if a fault in the second switching cell is not communicated during the predetermined period of time; and
    triggering one of the triggering elements for short-circuiting switching cell connections only if the identification of a fault in a first switching cell, which is not followed by identification of a fault in a second switching cell during a predetermined period of time, has repeatedly occurred for the first switching cell.

2. The method as claimed in claim 1, wherein the switching cells are monitored in such a manner that desaturation of an IGBT used in the switching cells outside a switching time window, during which one or more power semiconductor switches are driven to switch, is identified as a fault in one of the switching cells.

3. The method as claimed in claim 2, wherein the switching cells are monitored in such a manner that a voltage change outside a switching time window, during which one or more power semiconductor switches are driven to switch, and where a voltage change exceeds a predetermined voltage magnitude, and is identified as a fault in one of the switching cells.

4. The method as claimed in claim 1, wherein the switching cells are monitored in such a manner that a voltage change outside a switching time window, during which one or more power semiconductor switches are driven to switch, and where a voltage change exceeds a predetermined voltage magnitude, and is identified as a fault in one of the switching cells.

5. The method as claimed in claim 1, comprising:
    after a fault has been identified in the first switching cell, driving of power semiconductor switches of the first switching cell is suppressed by the power semiconductor switches being switched off.

6. A converter having a number of inputs and a number of outputs for converting an input voltage into an output voltage, comprising:
    a plurality of bridge branches having one or more switching cells connected in series, wherein each bridge branch connects one of the inputs to one of the outputs,
    a monitoring unit in each of the switching cells which is designed to determine a fault;
    a triggering element in each of the switching cells which is designed to short-circuit switching cell connections; and
    a central monitoring device which has a communication link to each of the monitoring units and is designed to receive an indication of a fault identified in one of the monitoring units, and to trigger one of the triggering elements if a fault in a second switching cell is not identified after a fault has been identified in a first switching cell,
wherein the central monitoring device includes a timer, which is started upon receiving the indication of the fault, and the central monitoring device being configured to determine whether occurrence of a fault in the first switching cell is communicated before expiry of the predetermined period of time based on the timer.

* * * * *